June 7, 1938.　　　　　E. F. GIELOW　　　　　2,119,673
LOAF FORMING MACHINE
Filed Nov. 21, 1935　　　　2 Sheets-Sheet 2

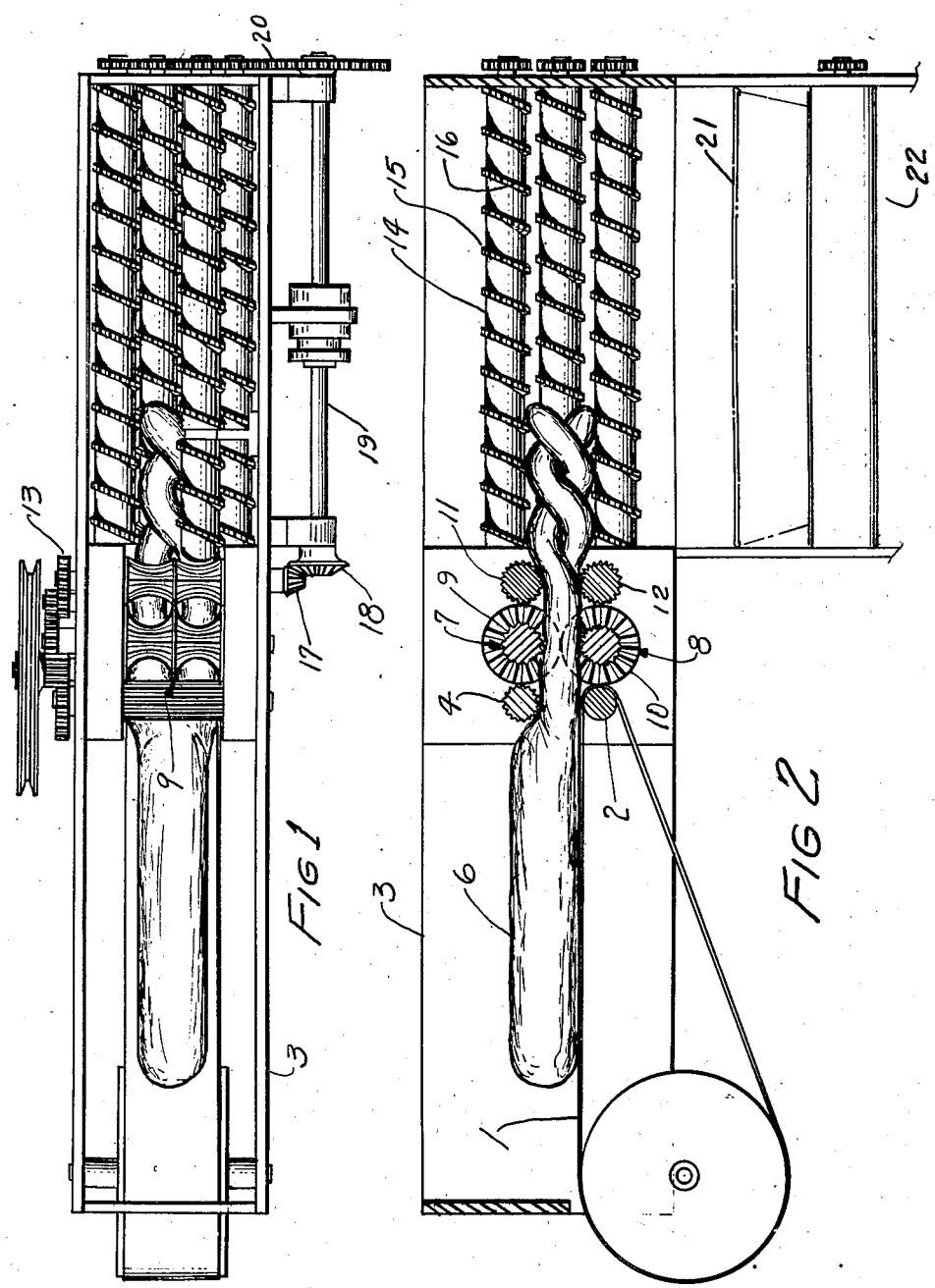

Elmer F. Gielow
INVENTOR

BY Lyman C. Conger
ATTORNEY

Patented June 7, 1938

2,119,673

UNITED STATES PATENT OFFICE 2,119,673

LOAF-FORMING MACHINE

Elmer F. Gielow, Kohler, Wis.

Application November 21, 1935, Serial No. 50,818

10 Claims. (Cl. 107—8)

My invention relates to improvements in a method and means for forming dough into loaves of what is known in the art as "twisted bread".

It has previously been known in the art that bread of more even, fine texture and freer from large gas holes is obtained by twisting the dough of which the loaf is made. This operation has been performed by twisting two or more portions of dough together for several twists and then baking the twisted loaf so obtained. The twisting creates a uniform elongation of cell structure and changes the direction of the elongated cells so that they do not penetrate the entire slice, resulting in bread of a superior texture and flavor.

This twisting operation is ordinarily, and necessarily with the equipment now available, performed manually and it is an object of my invention to provide mechanism whereby the twisting of the dough may be accomplished mechanically. It is a further object of my invention to provide mechanism whereby a single loaf may be formed into two or more portions and twisted in one operation. It is a still further object of my invention to provide mechanism whereby the dough being formed and twisted is also elongated during the process whereby, due to the release of gas formed during the raising of the dough and the division of the large gas cells or cavities formed thereby into numerous smaller cavities, a bread of better texture and flavor is obtained.

I attain these objects by the mechanism illustrated in the accompanying drawings, in which—

Figure 3:
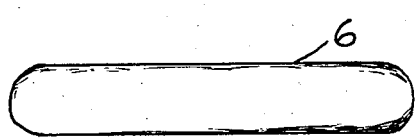
Figure 4:
Figure 5:
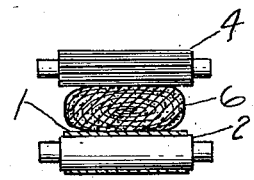
Figure 6:
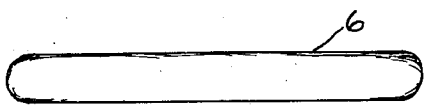
Figure 7:
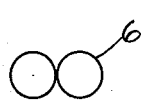
Figure 8:
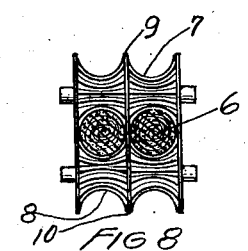
Figure 9:
Figure 10:
Figure 11:
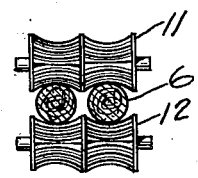

Figure 1 is a plan view of the device; Figure 2, a side elevation thereof; Figure 3, a side view of a loaf showing one stage in its formation; Figure 4, an end view thereof; Figure 5, a sectional view thereof showing the action of a portion of the mechanism thereon; Figures 6, 7, and 8, views similar, respectively, to Figures 3, 4, and 5 but showing a different stage in the formation of the loaf; Figures 9, 10, and 11, similar views showing a still further advanced stage in the formation of the loaf; and Figures 12, 13, and 14, similar views showing the final stage in the formation of the loaf.

Similar numerals refer to similar parts throughout the several views.

In the operation of the device a portion of dough, such as is delivered by the machine known as a molder and in common use in bakeries, is placed on the conveyor 1 which passes over a roll 2, rotatably mounted in the frame 3. The conveyor 1 may be driven by any suitable means so that the portion of dough passes under the roll 4 which is positioned above the roll 2 and likewise rotatably mounted in the frame 3. The rolls 2 and 4 are suitably spaced so as to act as flattening rolls and cause the flattening of the dough portion or loaf 6 as shown by Figures 4 and 5. The roll 4 is preferably corrugated as shown.

The dough delivered from the flattening rolls 2 and 4 passes between a pair of forming rolls 7 and 8. The rolls 7 and 8 are provided with annular raised or center portions 9 and 10 positioned at approximately the center portion of the roll, the roll being arcuate in configuration between the center portion and the extremity of the roll. As the loaf 6 passes between the forming rolls 7 and 8 it is formed into two portions of substantially cylindrical shape by the arcuate portions of the rolls as shown in Figure 8. The center portions 9 and 10 may be set in contact with each other so as to completely divide the loaf longitudinally or they may be set slightly spaced so as to leave a connecting web between the two halves of the loaf. It will be understood that the loaf may be divided into more than two portions if desired or that it may be formed into portions non-cylindrical in shape it being necessary only that the portions be approximately parallel longitudinally.

From the rolls 7 and 8 the loaf passes between the feeding rolls 11 and 12. The rolls 7 and 8 and 11 and 12 are preferably corrugated as shown so as to engage the loaf more securely.

Suitable gearing 13 is provided for driving the rolls 2, 4, 7, 8, 11, and 12. The gearing 13 is so related that the circumferences of the rolls 7 and 8 are driven at a greater speed than the circumferences of the rolls 2 and 4 and the circumferences of the rolls 11 and 12 are, in turn driven at greater speed than the circumferences of the rolls 7 and 8. Thus the loaf is successively stretched or elongated by its passage through the rolls as shown by Figures 3, 6, and 9. This practically simultaneous lateral and longitudinal working of the dough breaks up and divides the large gas holes or cavities into smaller cavities, thus materially improving the texture of the bread.

The loaf is now ready for the twisting operation. This is performed by a plurality of rolls 14, for example five as illustrated, arranged at equidistant intervals around the circumference of a circle the center point of which approximates the point of discharge of the loaf portions from the rolls 11 and 12. Each of the rolls 14 is provided with a helical land 15 which is preferably notched at intervals to form the teeth 16. It will be understood that the teeth 16 are for the purpose of insuring firm engagement with the loaf and that they may be dispensed with if desired.

The rolls 14 are revolved by any suitable means such as, for example, the bevel gear 17 attached to the roll 11 and meshing with the bevel gear 18, attached in turn to the shaft 19 which drives the rolls 14 through suitable gearing 20.

Figure 12:
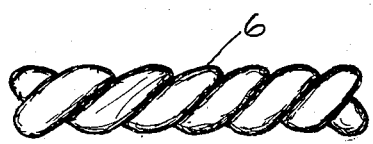
Figure 13:
Figure 14:
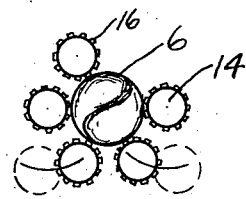

The loaf 6, in the form of two adjacent and longitudinally parallel portions, is fed into the center of the space between the rolls 14 and is engaged by the lands 15 of the latter. The revolving motion of the rolls 14 causes the two portions of the loaf to be simultaneously fed forward and twisted about each other to form a twisted loaf such as is illustrated in Figures 12 to 14.

The finished loaf may be discharged at the extremities of the rolls 14 or means may be provided whereby, when the loaf reaches a certain position, the lowermost rolls are moved out of position by an eccentric, allowing the loaf to drop onto a pan 21 or conveyor 22 placed thereneath.

In order to demonstrate the utility of the device certain features thereof have been illustrated and described more or less specifically, however, it will be understood that the invention is by no means restricted to the specific embodiment thereof disclosed and I claim broadly any device, mechanism or method within the scope of the appended claims.

I claim:

1. In combination, in a dough forming machine, a conveyor, a pair of flattening rolls adjacent said conveyor and adapted to cause the flattening of loaves of dough passed therebetween, said conveyor being adapted to cause loaves of dough placed thereon to be passed between said rolls, a pair of forming rolls adapted to receive said loaf from said flattening rolls and to form the same into a plurality of juxtaposed approximately cylindrical portions, a pair of feeding rolls adapted to receive said portions from said forming rolls, said flattening, forming and feeding rolls operating conjointly to feed said loaves toward and into twisting mechanism, means for actuating said rolls, said means being adapted to drive the circumferences of said forming rolls at greater speed than the circumferences of said flattening rolls and the circumferences of said feeding rolls at greater speed than the circumferences of said forming rolls, said twisting mechanism comprising a plurality of twisting rolls arranged at equidistant intervals about the circumference of a circle, the center point of which approximates the point of discharge of the loaf portions from said feeding rolls, each of said twisting rolls being provided with a helical land adapted to engage said loaf portions, said land being notched at intervals to form teeth and means for revolving said twisting rolls.

2. In combination, in a dough forming machine, a conveyor, a pair of flattening rolls adjacent said conveyor and adapted to cause the flattening of loaves of dough passed therebetween, said conveyor being adapted to cause loaves of dough placed thereon to be passed between said rolls, a pair of forming rolls adapted to receive said loaf from said flattening rolls and to form the same into a plurality of juxtaposed approximately cylindrical portions, a pair of feeding rolls adapted to receive said portions from said feeding rolls, said flattening, forming and feeding rolls operating conjointly to feed said loaves toward and into twisting mechanism, means for actuating said rolls, said twisting mechanism comprising a plurality of twisting rolls arranged at equidistant intervals about the circumference of a circle the center point of which approximates the point of discharge of the loaf portions from said feeding rolls, each of said twisting rolls comprising a helical land adapted to engage said loaf portions and means for revolving said twisting rolls.

3. In combination, in a dough forming machine, a conveyor, a pair of flattening rolls adjacent said conveyor and adapted to cause the flattening of loaves of dough passed therebetween, said conveyor being adapted to cause loaves of dough placed thereon to be passed between said rolls, a pair of forming rolls adapted to receive said loaf from said flattening rolls and to form the same into a plurality of juxtaposed approximately cylindrical portions, a pair of feeding rolls adapted to receive said portions from said forming rolls, said flattening, forming and feeding rolls operating conjointly to feed said loaves toward and into twisting mechanism, means for actuating said rolls, said means being adapted to drive the circumferences of said forming rolls at greater speed than the circumferences of said flattening rolls and the circumferences of said feeding rolls at greater speed than the circumferences of said forming rolls, said twisting mechanism comprising a plurality of twisting rolls arranged at substantially equidistant intervals about the circumference of a circle the center point of which approximates the point of discharge of the loaf portions from said feeding rolls, each of said twisting rolls being provided with a helical land adapted to engage said loaf portions and means for revolving said twisting rolls.

4. In combination, in a dough forming machine, means for flattening a loaf of dough, means for forming said loaf into a plurality of approximately cylindrical portions, means for feeding said portions into twisting mechanism, means for actuating said flattening means, means for actuating said forming means, means for actuating said feeding means, said forming means being adapted to advance said loaf faster than said flattening means and said feeding means being adapted to advance said loaf faster than said forming means whereby said loaf is successively elongated by its passage through said machine.

5. In combination, in a dough forming machine, means for forming a loaf of dough into a plurality of juxtaposed approximately cylindrical portions, means for feeding said portions into twisting mechanism, in juxtaposed relationship, means for actuating said forming means, means for actuating said feeding means and means for twisting said cylindrical portions about each other.

6. In combination, in a dough forming machine, means for forming a loaf of dough into a plurality of juxtaposed approximately cylindrical portions and means for twisting said cylindrical portions about each other, said forming means also being adapted to feed said portions into said twisting means in juxtaposed relationship.

7. In a dough forming machine, twisting mechanism comprising a plurality of twisting rolls arranged at equidistant intervals about the circumference of a circle, the space between said rolls being adapted to receive a loaf of dough, each of said twisting rolls being provided with a helical land adapted to engage said loaf.

8. A dough forming machine comprising a pair of forming rolls, said rolls being provided with an annular raised center portion, said roll being arcuate in configuration between said center portion and the extremities of said roll and a plurality of twisting rolls arranged at substantially equidistant intervals about the circumference of a circle, each of said twisting rolls being provided with a helical land adapted to engage a loaf of dough, said forming rolls being adapted to feed portions of dough toward said twisting rolls in juxtaposed relationship.

9. In a dough forming machine, twisting mechanism comprising a plurality of twisting rolls arranged in spaced relationship, the space between said rolls being adapted to receive a loaf of dough, each of said twisting rolls being provided with a helical land adapted to engage said loaf.

10. In a dough forming machine, means for forming a loaf of dough into a plurality of juxtaposed portions, means for feeding said portions into twisting mechanism in juxtaposed relationship and means for twisting said juxtaposed portions about each other.

ELMER F. GIELOW.